(12) United States Patent
Oshima et al.

(10) Patent No.: US 9,452,670 B2
(45) Date of Patent: Sep. 27, 2016

(54) POWER UNIT SUPPORT STRUCTURE FOR OFF-ROAD VEHICLES

(71) Applicant: HONDA MOTOR CO., LTD., Tokyo (JP)

(72) Inventors: Tadashi Oshima, Dublin, OH (US); Yasuo Hanafusa, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 14/496,524

(22) Filed: Sep. 25, 2014

(65) Prior Publication Data

US 2015/0090514 A1 Apr. 2, 2015

(30) Foreign Application Priority Data

Sep. 30, 2013 (JP) ................................ 2013-203544

(51) Int. Cl.
*B60K 5/12* (2006.01)
*B60K 17/34* (2006.01)

(52) U.S. Cl.
CPC ............... *B60K 5/12* (2013.01); *B60K 5/1216* (2013.01); *B60K 17/34* (2013.01)

(58) Field of Classification Search
CPC ........ B60K 5/02; B60K 5/12; B60K 5/1208; B60K 5/1216; B60K 5/1225; B60K 5/1241; B62D 21/11
See application file for complete search history.

(56) References Cited

U.S. PATENT DOCUMENTS

| 3,825,090 | A | * | 7/1974 | Runkle | B60K 5/1216 180/292 |
| 4,449,603 | A | * | 5/1984 | Langwieder | B60K 5/04 180/232 |
| 5,074,374 | A | * | 12/1991 | Ohtake | B60K 5/1216 180/300 |
| 5,103,943 | A | * | 4/1992 | Ide | B60K 5/1208 180/300 |
| 5,967,251 | A | * | 10/1999 | Turl | B60K 5/1241 180/297 |
| 6,761,242 | B2 | * | 7/2004 | Yoshida | B60K 5/12 180/232 |
| 6,823,960 | B2 | * | 11/2004 | Shimizu | B60K 5/12 180/228 |
| 7,708,103 | B2 | * | 5/2010 | Okuyama | B60K 5/1216 180/291 |
| 9,045,031 | B2 | * | 6/2015 | Kouma | B60K 5/1216 |
| 9,145,047 | B2 | * | 9/2015 | Glover | B60K 5/1241 |
| 2006/0157292 | A1 | * | 7/2006 | Miyagawa | B60K 5/1216 180/312 |
| 2007/0131469 | A1 | * | 6/2007 | Kim | B60K 5/1216 180/293 |
| 2008/0078917 | A1 | * | 4/2008 | Roehrl | B60K 5/1208 248/555 |

FOREIGN PATENT DOCUMENTS

JP 4783085 B 9/2011

* cited by examiner

*Primary Examiner* — Katy M Ebner
(74) *Attorney, Agent, or Firm* — Honda Patents & Technologies North America, LLC; Clifford B Vaterlaus

(57) ABSTRACT

A vehicle includes a power unit with an engine that transmits drive force forward and backward to front and rear wheels via propeller shafts. The power unit is supported on a vehicle frame by engine mounts provided at three locations. An engine mount on one side of a crankshaft is farther from the center of gravity of the power unit than the other two mounts. This engine mount joins the crank case and the vehicle frame. The two other engine mounts on the other side of the crankshaft are closer to the center of gravity. These engine mounts join the vehicle frame and front and rear ends of an engine hanger that is joined to the crank case and extends forward and backward beyond at least one of a front end and a rear end of the crank case.

20 Claims, 8 Drawing Sheets

POWER UNIT SUPPORT STRUCTURE FOR OFF-ROAD VEHICLES

CROSS REFERENCES TO RELATED APPLICATIONS

The present application claims priority under 35 U.S.C. §119 to Japanese Patent Application No. 2013-203544, filed Sep. 30, 2013, entitled "Power Unit Support Structure for All Terrain Vehicle," the contents of which are incorporated herein by reference in their entirety.

BACKGROUND

1. Field

The present disclosure relates to a power unit support structure for an off-road vehicle.

2. Description of the Related Art

Conventionally, an off-road vehicle is provided with a power unit having a longitudinal engine layout with a crankshaft that is rotatably supported by a crank case and extends along the front-to-back direction of the vehicle. The vehicle includes a vehicle frame that supports the power unit and front and rear wheels. Such vehicle is known to be capable of traveling off-road carrying two passengers and cargo on a cargo rack.

The power unit support structure of this known off-road vehicle is such that a sub-frame that is mounted to the crank case has a rectangular shape as seen in plan view, and is supported by front and rear engine mounts. An engine mount subjected to torque reaction force is provided between a cylinder unit and a longitudinally extending main frame.

SUMMARY

Because the above-described conventional power unit support structure for an off-road vehicle uses a rectangular sub-frame, there is the disadvantage that the size of the support structure is increased.

In addition, because the structure is such that the sub-frame that is mounted to the crank case and has a rectangular shape as seen in plan view is supported by the front and rear engine mounts, and the engine mount subjected to torque reaction force is provided between the cylinder unit and the longitudinally extending main frame, it is difficult to equalize the load placed upon the engine mounts, resulting in an increase in the size of the support structure.

One feature of the present disclosure is to provide a power unit support structure for an off-road vehicle that does not require a rectangular shaped sub-frame. Also, the present arrangement may allow for equalization of the load placed upon various engine mounts and allow a reduction in size of the mounts.

In one embodiment, the power unit support structure for an off-road vehicle according to the present disclosure is provided with: a power unit in which a drive force distributor mechanism that distributes the drive force of the engine to the front and rear is provided at least to the front or the rear of the longitudinal engine layout. The engine has a crankshaft that is rotatably supported by a crank case and extends in a front-to-back direction of the vehicle. Drive force is transmitted from the drive force distributor mechanism to front and rear wheels via a propeller shaft. A vehicle frame that supports the power unit, supports the front and rear wheels. The vehicle is capable of traveling off-road carrying multiple passengers and cargo. A power unit support mechanism is provided in which the power unit is supported on the vehicle frame using a total of three engine mounts, one provided at one side of the crankshaft of the crank case and two provided on the other side. The one engine mount to one side, which is farther from the center of gravity of the power unit, joins the crank case and the vehicle frame. The two engine mounts on the other side, which are closer to the center of gravity, join the vehicle frame and both front and rear ends of an engine hanger joined to the crank case and extending forward and backward beyond at least one of the front end and the rear end of the crank case.

In accordance with this power unit support structure for an off-road vehicle, the one engine mount on one side, which is farther from the center of gravity of the power unit, joins the crank case and the vehicle frame. The two engine mounts to the other side, which are closer to the center of gravity, join the vehicle frame and the front and rear ends of the engine hanger joined to the crank case and extending forward and backward beyond at least one of the front end and the rear end of the crank case, thereby eliminating the need for a rectangular sub-frame, as in the prior art.

The side farther from the center of gravity of the power unit is supported by the one engine mount, and the side closer to the center of gravity is supported by the two engine mounts, thereby allowing the load placed upon the engine mounts to be equalized.

In accordance with this power unit support structure for an off-road vehicle, as discussed above, there is no need for a rectangular sub-frame, the load placed upon the engine mounts can be equalized, and size can be reduced.

In another embodiment of the present disclosure, the power unit support structure for an off-road vehicle may have a configuration in which the drive force distributor mechanism is provided either to the front or the rear of the crank case. A propeller shaft for transmitting drive force to either the rear wheels or the front wheels extends through a side surface of the crank case. The engine hanger extends forward and backward roughly parallel with the propeller shaft so as to sandwich the propeller shaft between the hanger and the crank case.

Such a configuration allows the engine mounts on the other side to be disposed far away from the center of gravity of the power unit, thereby reducing the load upon the engine mounts.

In another embodiment, the power unit support structure for an off-road vehicle may have a configuration in which each of the three engine mounts of the power unit support mechanism has a bracket and damping material joined to the bracket by an attachment bolt, and all of the attachment bolts extend in a front-to-back direction of the vehicle.

The rotation of the engine yielded by the longitudinal orientation of the crankshaft, loads generated by acceleration and deceleration, and drive force yielded by the propeller shafts extending forward and backward are all generated around an axis running in the front-to-back direction of the vehicle, thereby reducing the load generated around an axis running in a left-to-right direction of the vehicle.

Disposing all the attachment bolts so as to extend in the front-to-back direction of the vehicle allows the damping materials (for example, rubber) of the engine mounts to be provided in a direction adjusted thereto, and the above mentioned loads to be efficiently received, thereby allowing the size of the engine mounts to be reduced.

In another embodiment of the present disclosure, the power unit support structure for an off-road vehicle may have a configuration in which the engine hanger includes an engine attachment section, having a U-shaped cross section, that is screwed to a boss projecting from the crank case at a plurality of locations sandwiched by front and rear walls. The engine hanger may also include front and rear mount-supporting sections for supporting the front and rear engine mounts. Also, the engine hanger may include a plurality of linking pipes that connect the front and rear mount-supporting sections and extend joined to front and rear walls of the engine attachment section. In this configuration, the members extending from the engine attachment section to the mount-supporting sections are joined at two locations, each of the front and rear walls of the engine attachment section, thereby increasing strength and rigidity.

Another embodiment of the present disclosure may include the power unit support structure for an off-road vehicle having a configuration in which the engine attachment section of the engine hanger has a space provided between the two joining sections that join with the boss of the crank case, and the propeller shaft runs through that space. With this configuration, the two linking pipes are extended with a wide space therebetween, and therefore strength and rigidity (especially torsional rigidity) are increased.

In another embodiment, the power unit support structure for an off-road vehicle may have a configuration in which one of the engine mounts provided on the front and the rear of the engine hanger is joined in advance to the power unit, and the engine mount on the other side is joined in advance to the vehicle frame as the engine mount. The engine mount joined in advance to the power unit is provided with a roughly horizontal receiving surface on a joining section of a vehicle frame bracket for joining to the vehicle frame. The engine mount joined in advance to the vehicle frame is provided with a roughly horizontal receiving surface on a joining section of a power unit bracket for joining to the power unit.

In this configuration, the power unit can be temporarily placed from above onto the vehicle frame placed on a horizontal surface, thereby facilitating installation.

DETAILED DESCRIPTION

Figure 1:
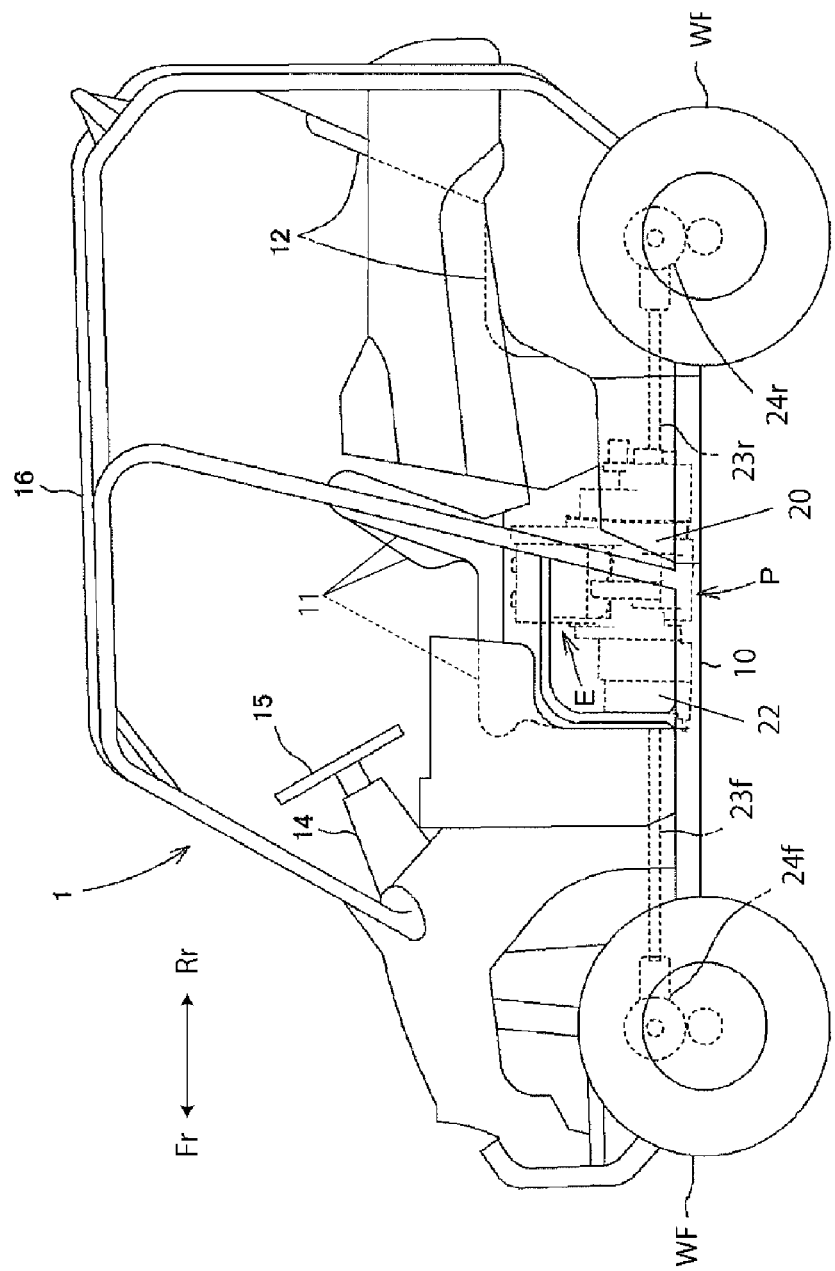
FIG. 1 is a left side view of an off-road vehicle in which is installed an embodiment of the power unit support structure for an off-road vehicle according to the present disclosure.

An embodiment of the power unit support structure for an off-road vehicle according to the present disclosure is described below with reference to the drawings. Note that the drawings are to be viewed according to the orientation of the labels; in the following description, "front", "rear", "left", "right", "up" or "above", and "down" or "below" are from the driver's viewpoint, and as necessary, the front of the vehicle will be labeled "Fr", the rear "Rr", the left side "L", the right side "R", up or above as "U", and down or below as "D". In the drawings, identical or equivalent parts will be identically labeled.

One embodiment of an off-road vehicle 1 shown in FIG. 1 is provided with a vehicle frame 10 upon which is mounted a power unit P.

The power unit P is provided with a longitudinal engine layout E comprising a crankshaft 21 that is rotatably supported by a crank case 20 (see FIGS. 2 and 4) and extends in a front-to-back direction of the vehicle, and a drive force distributor mechanism 22, provided to a front side of the engine E, for distributing drive force from the engine E to the front and rear. In the embodiment shown in the drawings, the drive force distributor mechanism 22 is provided to the front side of the engine E, but it may also be provided to the rear side.

The drive force distributor mechanism 22 transmits drive force from the engine E to the front wheels WF and rear wheels WR via front and rear propeller shafts 23$f$ and 23$r$ connected to the drive force distributor mechanism 22.

The vehicle frame 10 supports the power unit P and the front and rear wheels WF and WR, and is capable of traveling off-road carrying multiple passengers and cargo.

As shown in FIGS. 2 to 8, a power unit support structure 30 supports the power unit P upon the vehicle frame 10 using a total of three engine mounts ML, MRf, and MRr, one engine mount provided on one side of the crankshaft 21 of the crank case 20 (in the drawings, the left side) and two engine mounts provided at locations on the other side (in the drawings, the right side) of the crankshaft 21. Thus, the crankshaft 21 is sandwiched between the one engine mount ML on one side and two engine mounts MRf and MRr on the other side.

Figure 6:
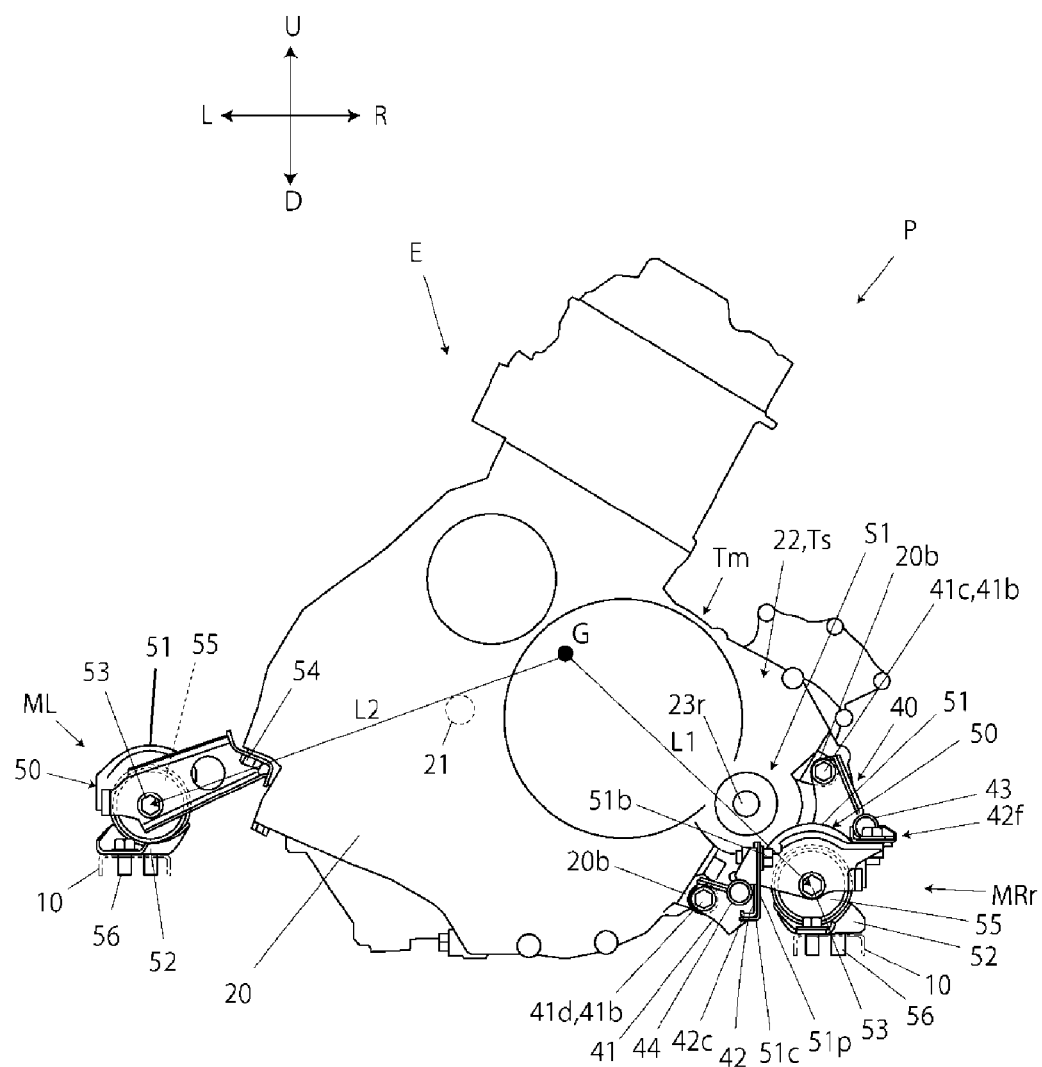
FIG. 6 is a rear view of the embodiment of FIG. 2.

The engine mount ML on one side, which is farther from the center of gravity G of the power unit P (FIG. 6), joins the crank case 20 of the engine E and the vehicle frame 10. In FIG. 6, the distance from the center of gravity G to the engine mount ML is labeled L2.

Figure 5:
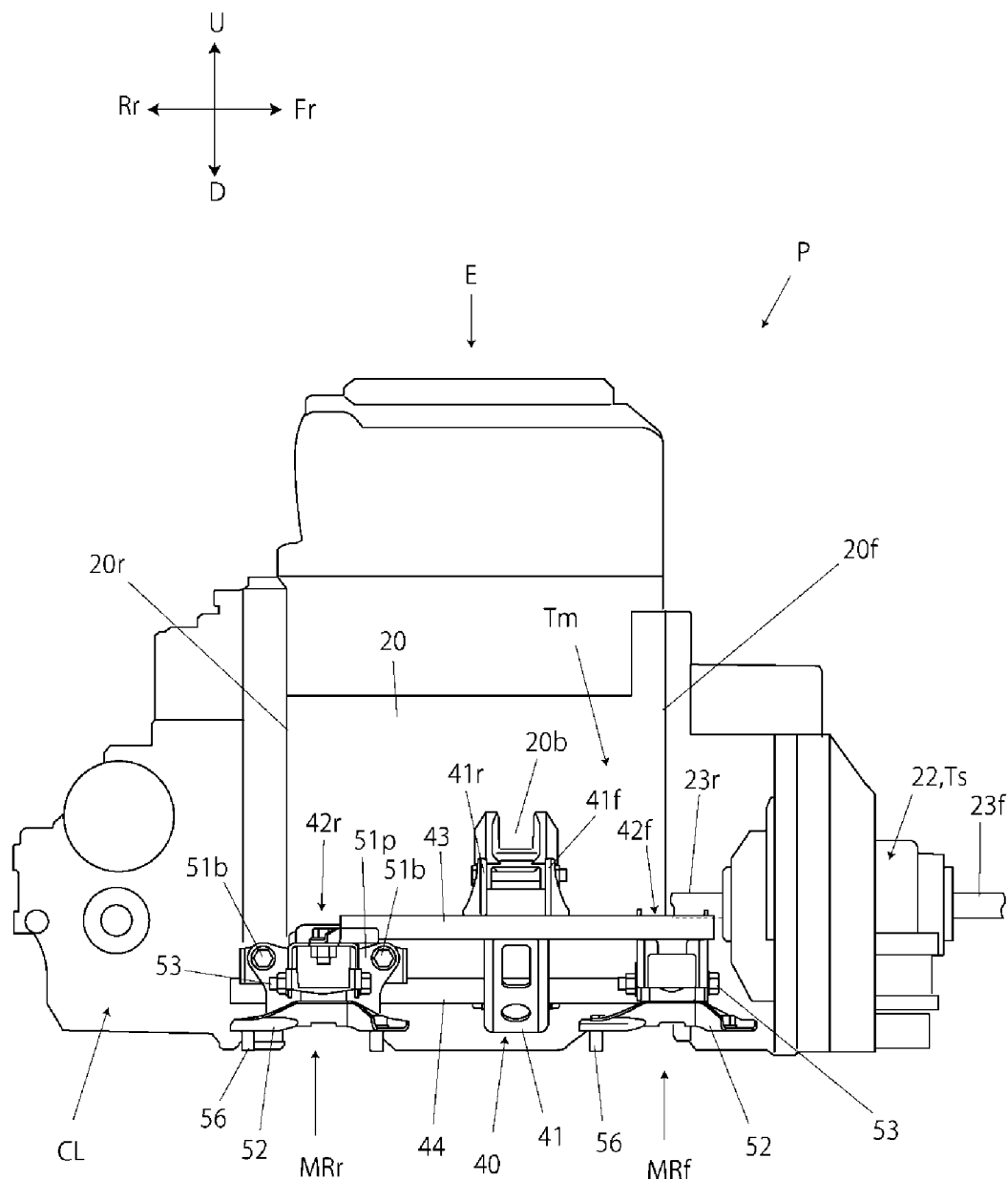
FIG. 5 is a right side view of the embodiment of FIG. 2

As shown in FIG. 5, the two engine mounts MRf and MRr on the other side, which are closer to the center of gravity G, join the vehicle frame 10 and the front and rear ends of an engine hanger 40 joined to the crank case 20 and extending forward and backward beyond at least one of a front end 20$f$ and a rear end 20$r$ of the crank case 20 (in the drawing, the front end 20$f$ and the rear end 20$r$). In FIG. 6, the distance from the center of gravity G to the engine mounts MRf and MRr is labeled L1.

Figure 2:
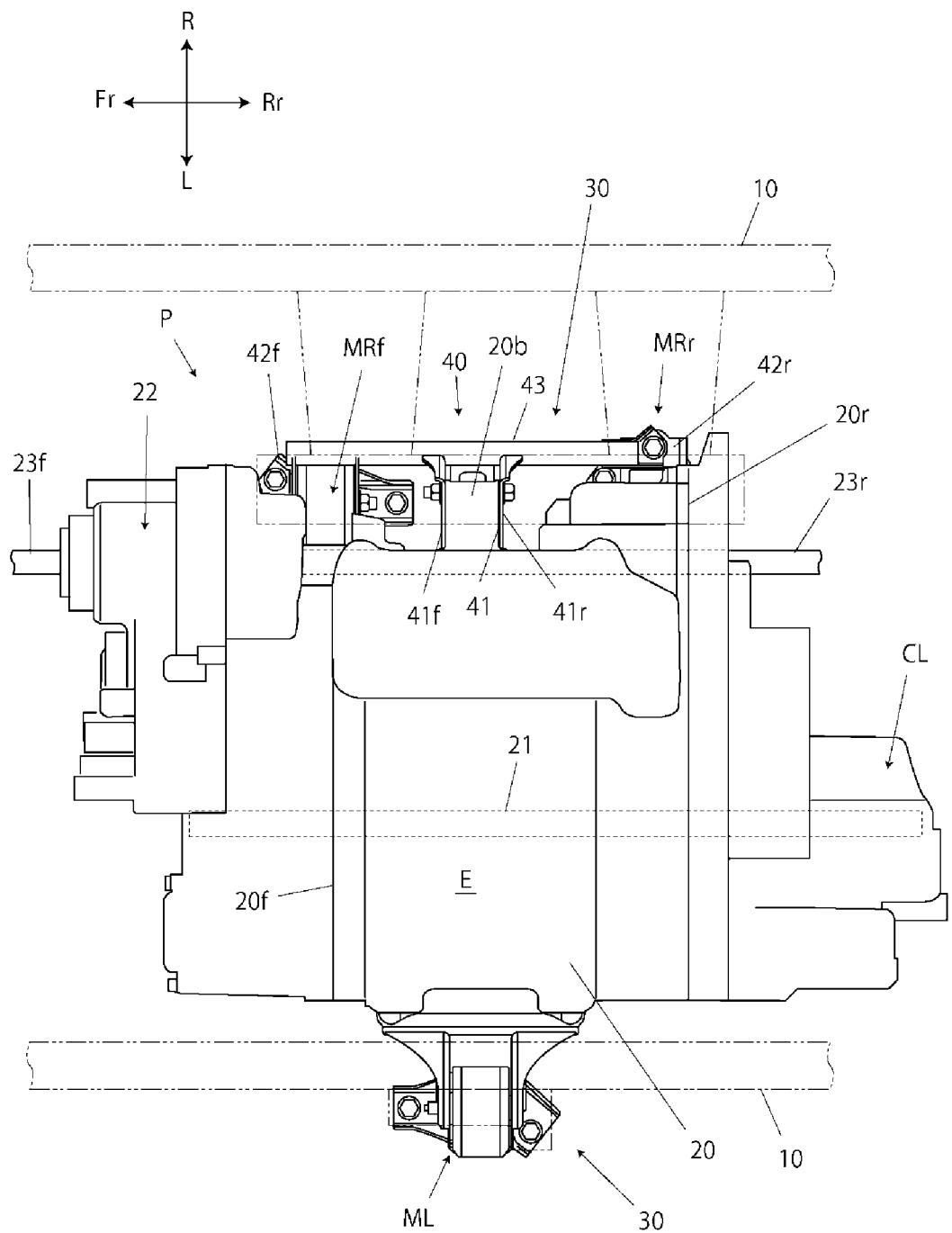
FIG. 2 is a plan view of an embodiment of the power unit support structure for an off-road vehicle according to the present disclosure.

In accordance with this power unit support structure 30 for an off-road vehicle, as shown in FIGS. 6 and 2, the one engine mount ML on one side (in the drawings, the left side), which is farther from the center of gravity G of the power unit P, joins the crank case 20 and the vehicle frame 10, and the two engine mounts MRf and MRr on the other side (in the drawings, the right side), which are closer to the center of gravity G, join the vehicle frame 10 and the front and rear ends of the engine hanger 40 joined to the crank case 20 and extending forward and backward beyond at least one of the front end and the rear end of the crank case 20, thereby eliminating the need for a rectangular sub-frame, as in the prior art.

The side farther from the center of gravity G of the power unit P is supported by the one engine mount ML, and the side closer to the center of gravity G is supported by the two engine mounts MRf and MRr, thereby allowing the load placed upon the engine mounts ML, MRf, and MRr to be equalized.

In addition, in the present embodiment, the engine E is longitudinally disposed so that the crankshaft 21 is parallel to the forward- and rearward-extending propeller shafts 23f and 23r, allowing the structure of the drive force distributor mechanism 22 to be simplified and reduced in size. In addition, in order to shorten the front-to-back length of the longitudinal power unit P, a two-cylinder engine having a crank case 20 with a short front-to-back length may be adopted as the engine E.

Low-pressure balloon tires for off-road driving may be used for the front wheels WF and rear wheels WR.

As shown in FIG. 1, the power unit P may be mounted roughly in the center of the front-to-back direction of the vehicle frame 10.

Motive force from the power unit P is transmitted from the front end of the front propeller shaft 23f to the left and right front wheels WF via a front final reduction gear unit 24f, and from the rear end of the rear propeller shaft 23r to the left and right rear wheels WR via a rear final reduction gear unit 24r.

Two or three front seats 11 may be disposed in a row from left to right on the vehicle frame 10 above the power unit P. Similarly, two or three rear seats 12 may be disposed in a row from left to right on the rear of the vehicle frame 10. These rear seats 12 can be folded down to form a cargo rack. It will be understood that other arrangements of seats may be used within the scope of the present disclosure.

The center seat of the front seats 11 may be situated slightly further to the front than the left and right seats. A steering wheel 15 is provided projecting from a steering column 14 in front of the driver's seat on the left-hand side.

The area above the front seats 11 and the rear seats 12 may be covered by a roll bar 16.

The engine E may be an in-line, 2-cylinder, water-cooled, four-stroke engine. However, it will be understood that other suitable engines may be used within the scope of the present disclosure.

Figure 4:
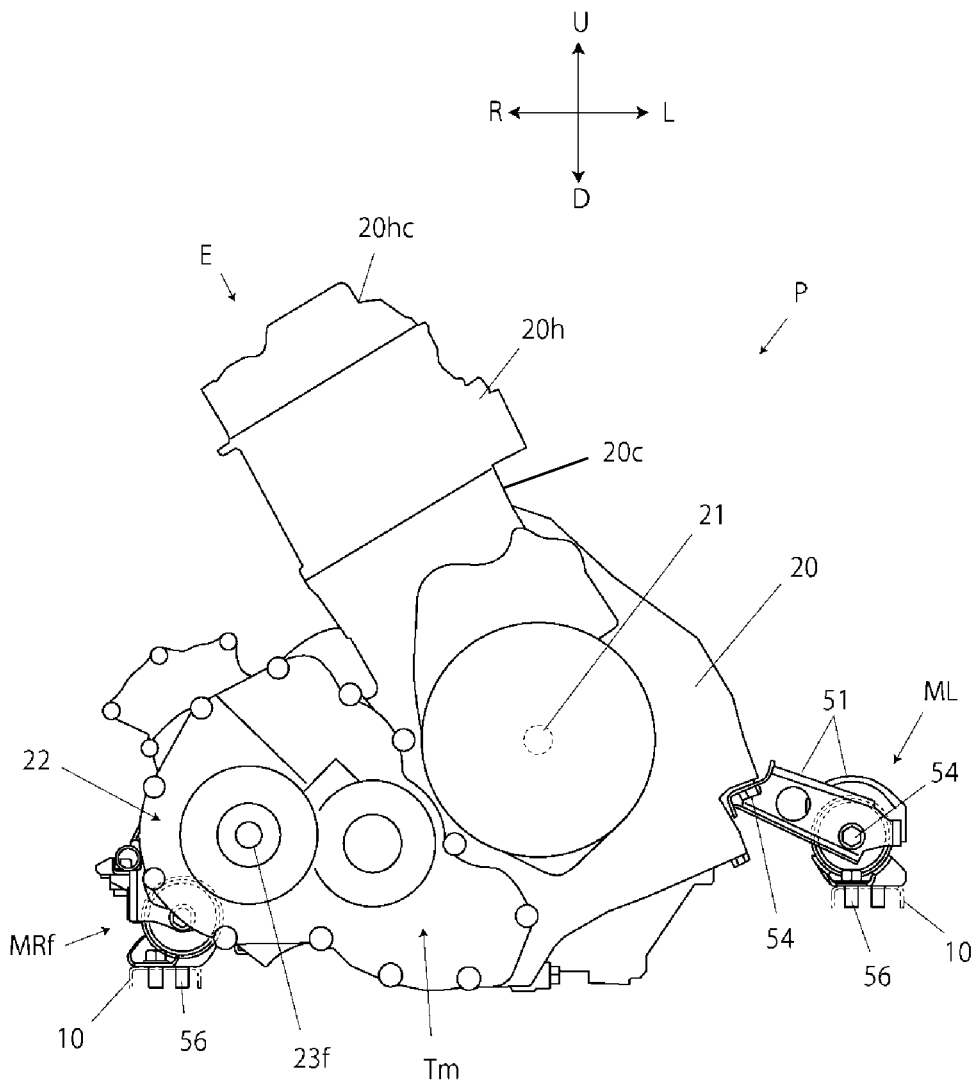
FIG. 4 is a front view of the embodiment of FIG. 2.

As shown in FIG. 4, a cylinder block 20c is integrally provided diagonally above and to the right of the crank case 20, and a cylinder head 20h and a cylinder head cover 20hc are stacked thereupon in that order.

As shown in FIGS. 5 and 6, a main transmission Tm is provided to the right of the crank case 20, and a secondary transmission Ts forming the drive force distributor mechanism 22 is provided in front of the main transmission Tm.

A clutch CL is provided to the rear of the crank case 20.

As shown in FIGS. 1 and 2, the drive force distributor mechanism 22 is provided to the front side of the crank case 20, and as shown in FIGS. 2 and 6, the propeller shaft 23r for transmitting drive force to the rear wheels WR extends through a side surface of the crank case 20, and the engine hanger 40 extends forward and backward roughly parallel with the propeller shaft 23r so as to sandwich the propeller shaft 23r between the engine hanger 40 and the crank case 20.

In this configuration, the propeller shaft 23r is interposed between the crank case 20 and the engine hanger 40, and as a result, the engine mounts MRf and MRr on the other side are disposed farther from the center of gravity G of the power unit P, thereby reducing the load upon the engine mounts MRf and MRr (due to the relationship of lever ratios).

A configuration in which the drive force distributor mechanism 22 is provided to the rear of the crank case 20, the propeller shaft 23f for transmitting drive force to the front wheels WF extends through the side surface of the crank case 20, and the engine hanger 40 is disposed roughly parallel to the propeller shaft 23f so as to sandwich the propeller shaft 23f between the engine hanger 40 and the crank case 20 will yield similar effects.

The three engine mounts ML, MRf and MRr of the power unit support mechanism 30 may have the same basic configuration, and as shown in FIG. 6, each comprises a bracket 50 and damping material 55 joined to the bracket 50 by an attachment bolt 53. The attachment bolts 53 may all be disposed so as to extend in the front-to-back direction of the vehicle.

The rotation of the engine E yielded by the longitudinal orientation of the crankshaft 21, loads generated by acceleration and deceleration, and drive force yielded by the propeller shafts 23f and 23r extending forward and backward are all generated around an axis running in the front-to-back direction of the vehicle. This reduces the load generated around an axis running in the left-to-right direction of the vehicle.

Disposing all the attachment bolts 53 so as to extend in the front-to-back direction of the vehicle allows the damping materials 55 (for example, rubber) of the engine mounts ML, MRf and MRr to be provided in a direction adjusted thereto (so as to appear rounded as viewed in the front-to-back direction of the vehicle), and the abovementioned loads to be efficiently received, thereby allowing the size of the engine mounts ML, MRf and MRr to be reduced.

Figure 8:
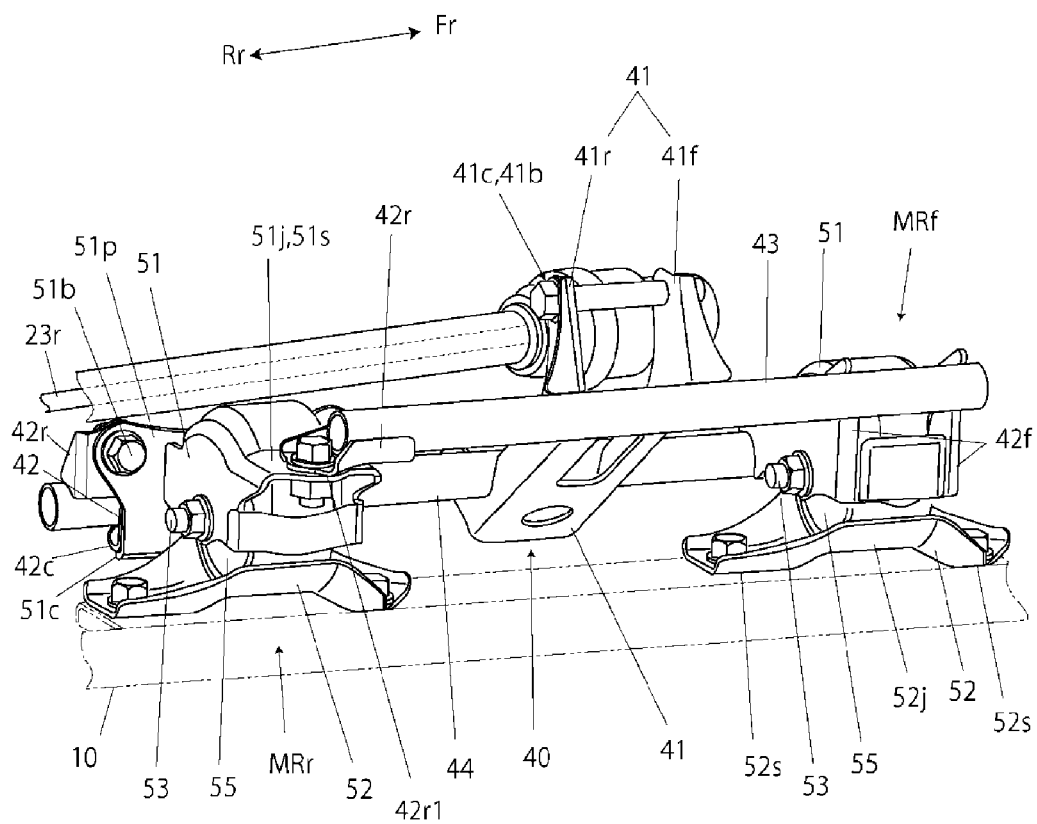
FIG. 8 is a partially abridged perspective view of the embodiment of FIG. 2.

As shown in FIGS. 6 and 8, each bracket 50 is provided with a power unit bracket 51 anchored to the power unit P and a frame bracket 52 anchored to the vehicle frame 10, and the damping material 55 is attached with the attachment bolt 53 being interposed between the power unit bracket 51 and the frame bracket 52.

Figure 3:
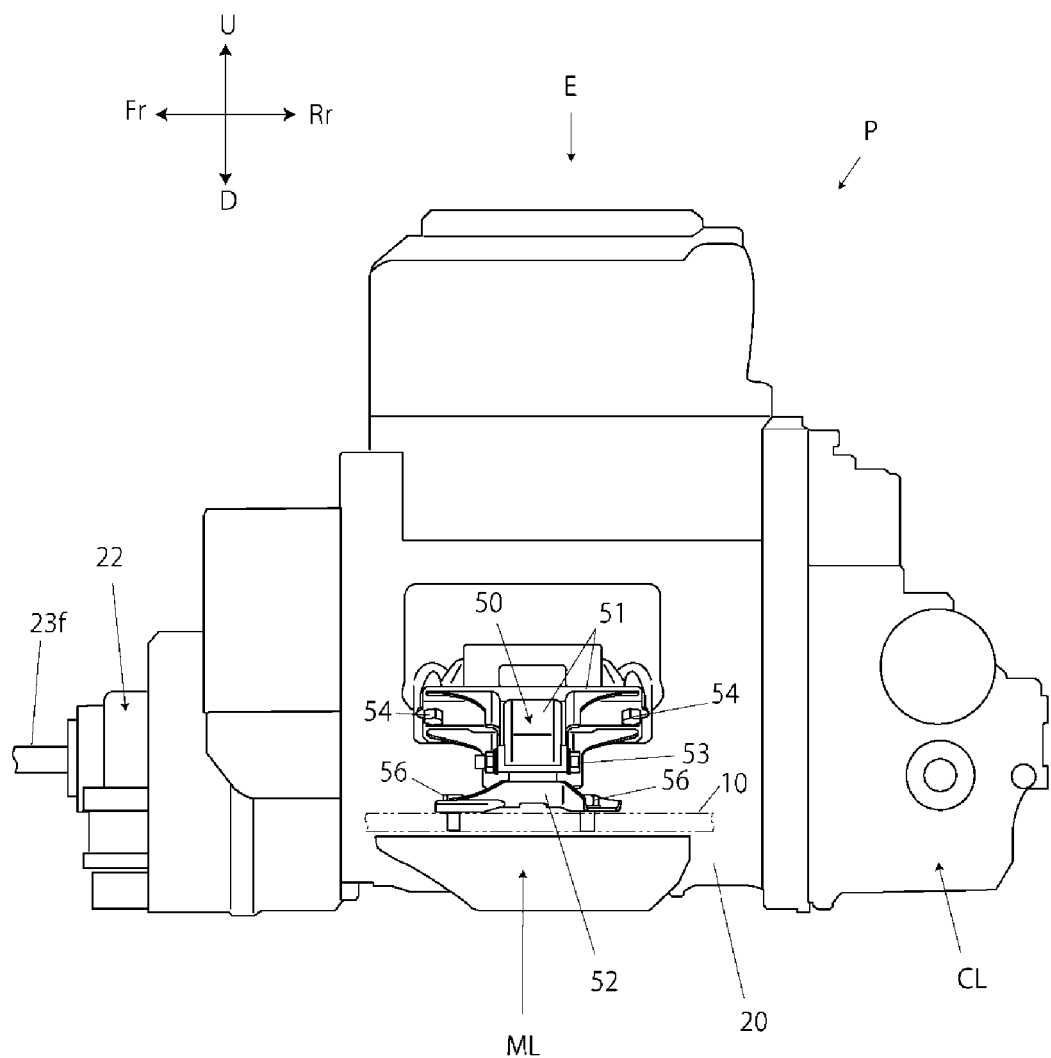
FIG. 3 is a left side view of the embodiment of FIG. 2.

As shown in FIGS. 3 and 6, the power unit bracket 51 of the engine mount ML is anchored to the crank case 20 by a bolt 54, and the frame bracket 52 is anchoring to the frame 10 by a bolt 56. The frame brackets 52 of the engine mounts MRf and MRr are also anchored to the frame 10 by bolts 56.

As shown primarily in FIG. 8, the engine hanger 40 comprises an engine attachment section 41 that is fastened to the crank case 20, front and rear mount-supporting sections 42f and 42r for supporting the front and rear engine mounts MRf and MRr, and a plurality of linking pipes 43 and 44 (in the drawing, two) connecting the engine attachment section 41 and the front and rear mount-supporting sections 42f and 42r.

The engine attachment section 41 is a section with a U-shaped cross section that is fastened to a boss 20b (see FIGS. 2 and 5) projecting from the crank case 20 at a plurality of locations (in the drawings, two locations) sandwiched between front and rear walls 41f and 41r. The two locations where the engine attachment section 41 is fastened to the boss 20b are labeled 41b in FIG. 6.

The linking pipes 43 and 44 are joined to the front and rear walls 41f and 41r of the engine attachment section 41, and extend forward and backward.

In this configuration, the linking pipes 43 and 44 extending from the engine attachment section 41 to the mount-supporting sections 42f and 42r (see FIG. 5) are joined at two locations each to the front and rear walls of the engine attachment section 41, thereby increasing strength and rigidity.

As shown in FIG. 6, the engine attachment section 41 of the engine hanger 40 is joined to the boss 20b of the crank case 20 at two joining sections 41c and 41d, a space S1 is provided between the joining sections 41c and 41d, and the propeller shaft 23r runs through the space S1.

With this configuration, the two linking pipes 43 and 44 are extended with a wide space therebetween, allowing for increased strength and rigidity (especially torsional rigidity).

The two joining sections 41c and 41d are each fastened and secured to the boss 20b of the crank case 20 by bolt nuts 41b.

In FIG. 8, one of the engine mounts MRf and MRr provided to the front and rear of the engine hanger 40 (in the drawing, the mount MRf) is joined in advance to the power unit P, and the other engine mount (in the drawing, mount MRr) is joined in advance to the vehicle frame 10.

Figure 7:
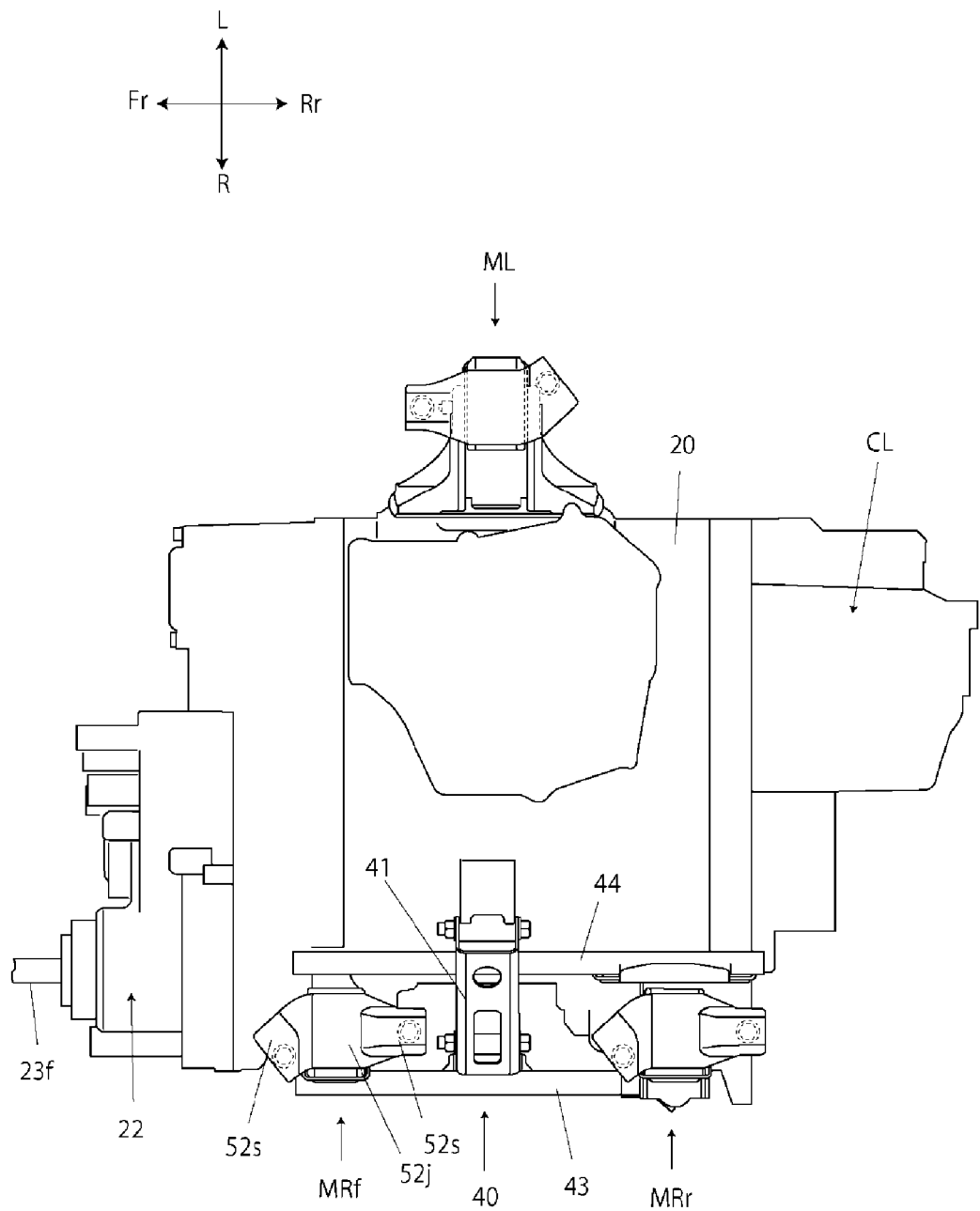
FIG. 7 is an underside view of the embodiment of FIG. 2.

The engine mount MRf joined in advance to the power unit P is provided with roughly horizontal receiving surfaces 52s on a joining section 52j of the vehicle frame bracket 52 for joining to the vehicle frame 10 (see FIG. 7).

Meanwhile, the engine mount MRr joined in advance to the vehicle frame is provided with roughly horizontal receiving surfaces 51s and 51c on a joining section 51j of the power unit bracket 51 for joining to the power unit P (in the present embodiment, to the engine hanger 40).

In this configuration, the power unit P can be temporarily placed from above onto the vehicle frame 10 placed on a horizontal surface (not shown), thereby facilitating installation.

In the embodiment shown in the drawings, the engine hanger 40 and the front engine mount MRf are anchored in advance to the power unit P along with the frame bracket 52.

Meanwhile, the rear engine mount MRr is anchored in advance to the vehicle frame 10 along with the power unit bracket 51.

When the power unit P is lowered from above in this state, the receiving surface 52s of the frame bracket 52 of the front engine mount MRf contacts the vehicle frame 10, and an undersurface 42r1 of the rear mount-supporting section 42r of the engine hanger 40 contacts the receiving surface 51s of the vehicle frame engine mount MRr, and as a result, the power unit P is temporarily placed upon the vehicle frame 10.

In the present embodiment, as shown in FIGS. 5, 6, and 8, the power unit bracket 51 of the engine mount MRr joined in advance to the vehicle frame has a standing plate 51p, a lower end of which is bent in an L shape (the bent section being labeled 51c).

Meanwhile, the rear mount-supporting section 42r of the engine hanger 40 is provided with a hanging plate 42p joined to the standing plate 51p by a bolt 51b, a lower end of the hanging plate 42p being bent in an L shape (the bent section being labeled 42c). When the power unit P is lowered from above, the standing plate 51p and the hanging plate 42p come into contact, and the two L-shaped bent sections 51c and 42c come into contact with each other.

As a result, the power unit P can be satisfactorily placed temporarily and positioned upon the vehicle frame 10.

The foregoing is a description of an embodiment of the present disclosure, but the present disclosure is not limited to the embodiment described above, and various modifications may be made thereto within the scope of the present disclosure.

The invention claimed is:

1. A power unit support structure for an off-road vehicle comprising:
   a power unit in which a drive force distributor mechanism that distributes the drive force of an engine to the front and rear is provided at least to the front or the rear of a longitudinal engine layout that has a crankshaft that is rotatably supported by a crank case and extends in a front-to-back direction of the vehicle, and drive force is transmitted from the drive force distributor mechanism to front and rear wheels via propeller shafts; and
   a vehicle frame that supports the power unit, supports the front and rear wheels, and is capable of traveling off-road carrying multiple passengers and cargo; wherein
   a power unit support mechanism is provided in which the power unit is supported on the vehicle frame using a total of three engine mounts, one provided on one side of the crankshaft of the crank case, and two provided on another side;
   the one engine mount on one side, which is disposed a first distance from a center of gravity of the power unit, joins the crank case and the vehicle frame; and
   the two other engine mounts on the other side, which are disposed a second distance from the center of gravity of the power unit, join the vehicle frame and front and rear ends of an engine hanger joined to the crank case and extending forward and backward beyond at least one of a front end and a rear end of the crank case;
   wherein the second distance is less than the first distance.

2. The power unit support structure for an off-road vehicle according to claim 1, wherein:
   the drive force distributor mechanism is provided either to the front or the rear of the crank case, and a propeller shaft for transmitting drive force to either the rear wheels or the front wheels extends through a side surface of the crank case; and
   the engine hanger extends forward and backward roughly parallel to the propeller shaft so as to sandwich the propeller shaft between the engine hanger and the crank case.

3. The power unit support structure for an off-road vehicle according to claim 1, wherein:
   each of the three engine mounts of the power unit support mechanism comprises a bracket and damping material joined to the bracket by an attachment bolt, the attachment bolts all extending in the front-to-back direction of the vehicle.

4. The power unit support structure for an off-road vehicle according to claim 1, wherein the engine hanger comprises:
   an engine attachment section, having a U-shaped cross section, that is fastened at a plurality of locations to a boss projecting from the crank case, the boss being sandwiched by front and rear walls;
   front and rear mount-supporting sections for supporting the front and rear engine mounts; and
   a plurality of linking pipes that connect the front and rear mount-supporting sections and extend joined to front and rear walls of the engine attachment section.

5. The power unit support structure for an off-road vehicle according to claim 4, wherein:
   the engine attachment section of the engine hanger is provided with a space between two joining sections that join with the boss of the crank case, and the propeller shaft runs through the space.

6. The power unit support structure for an off-road vehicle according to claim 1, wherein:
   one of the engine mounts provided to the front and rear of the engine hanger is joined to the power unit, and the other engine mount is joined to the vehicle frame;
   the engine mount joined to the power unit is provided with a roughly horizontal receiving surface on a joining section of a vehicle frame bracket for joining to the vehicle frame; and the engine mount joined to the vehicle frame is provided with a roughly horizontal receiving surface on a joining section of a power unit bracket for joining to the power unit.

7. A power unit support structure for a vehicle comprising:
a power unit comprising an engine having a crankshaft, the power unit having a center of gravity;
a vehicle frame that supports the power unit;
a power unit support mechanism for supporting the power unit on the vehicle frame through a total of three engine mounts positioned lower than the center of gravity of the power unit;
wherein one of the engine mounts is positioned on one side of the crankshaft, and the other two engine mounts are positioned on the other side of the crankshaft, and wherein the one engine mount is farther from the center of gravity of the power unit than the other two engine mounts.

8. The power unit support structure of claim 7, wherein the crankshaft is rotatably supported by a crank case to extend in a front-to-back direction of the vehicle.

9. The power unit support structure of claim 8, wherein the one engine mount joins the crank case and the vehicle frame.

10. The power unit support structure of claim 9, wherein the other two engine mounts join the vehicle frame and front and rear ends of an engine hanger joined to the crank case.

11. The power unit support structure of claim 10, wherein the engine hanger extends forward and backward beyond at least one of a front end and a rear end of the crank case.

12. The power unit support structure of claim 7, wherein each of the three engine mounts is attached by an attachment bolt that extends in a front-to-back direction of the vehicle.

13. The power unit support structure of claim 7, wherein the power unit further comprises a drive force distributor mechanism that distributes drive force of the engine to the front and rear of the vehicle, and drive force is transmitted from the drive force distributor mechanism to front and rear wheels via propeller shafts.

14. A power unit support structure for a vehicle comprising:
a power unit comprising an engine having a crank case supporting a crankshaft;
a vehicle frame that supports the power unit; and
a power unit support mechanism for supporting the power unit on the vehicle frame through a total of three engine mounts, each of the engine mounts being attached by an attachment bolt that extends in a front-to-back direction of the vehicle;
wherein one of the engine mounts joins the crank case and the vehicle frame, and the other two engine mounts join the vehicle frame and front and rear ends of an engine hanger joined to the crank case.

15. The power unit support structure of claim 14, wherein the one engine mount is positioned on one side of the crankshaft, and the other two engine mounts are positioned on the other side of the crankshaft.

16. The power unit support structure of claim 14, wherein the one engine mount is farther from a center of gravity of the power unit than the other two engine mounts.

17. The power unit support structure of claim 14, wherein each of the three engine mounts comprises a bracket and damping material.

18. The power unit support structure of claim 17, wherein the damping material is attached to the bracket in each of the three engine mounts by one of the attachment bolts.

19. The power unit support structure of claim 14, wherein the engine hanger extends forward and backward beyond at least one of a front end and a rear end of the crank case.

20. The power unit support structure of claim 19, wherein the engine hanger comprises a plurality of linking pipes.

* * * * *